Aug. 30, 1932. A. E. RICE ET AL 1,874,624
DISTRIBUTION OF WATER FOR COOLING BRAKE RIMS
Filed Aug. 11, 1930    3 Sheets-Sheet 1

Inventors
Allen Erwin Rice
Lewis Emanuel Zerbe
By Lyon & Lyon
Attorneys

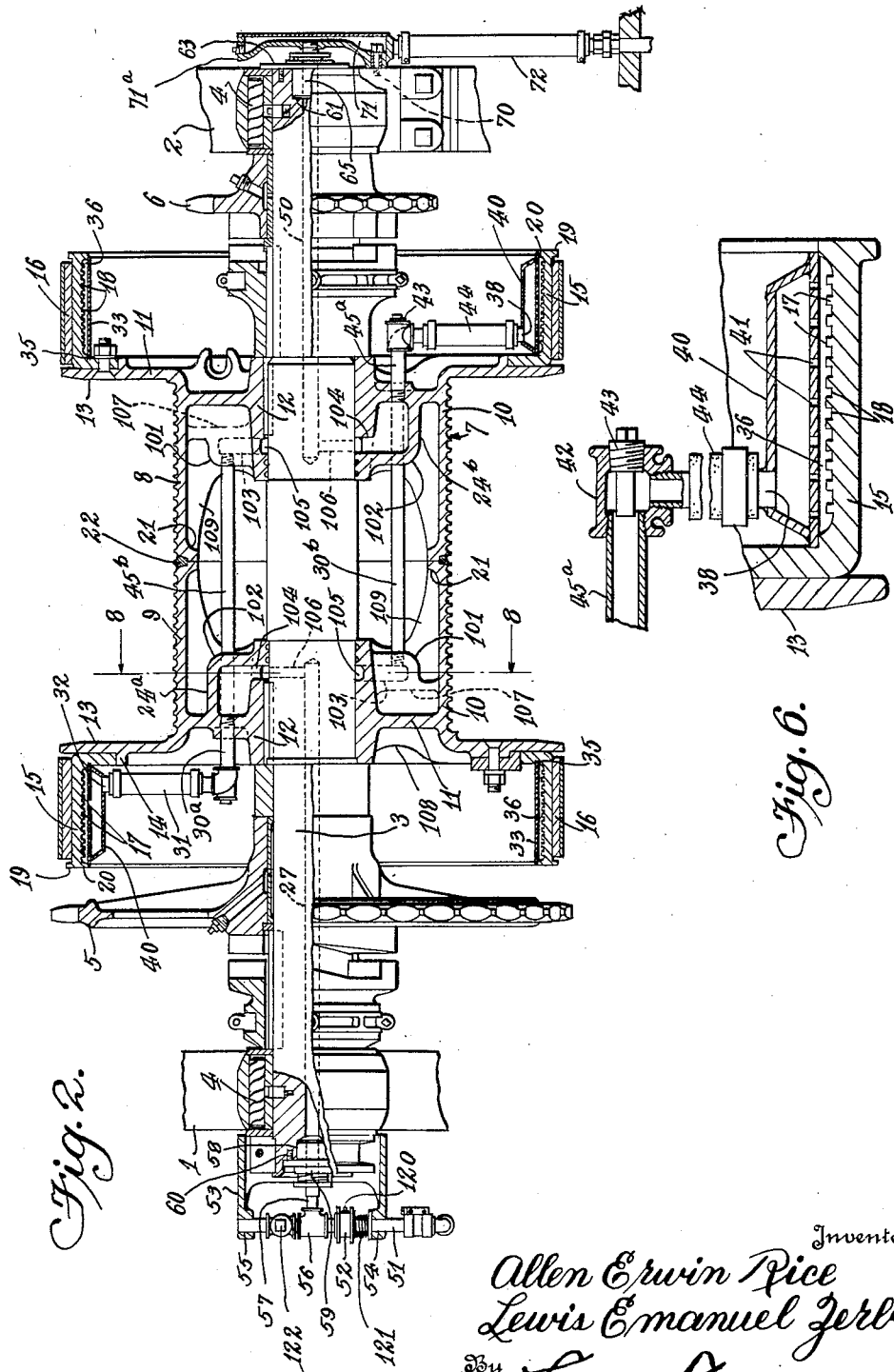

Aug. 30, 1932.  A. E. RICE ET AL  1,874,624
DISTRIBUTION OF WATER FOR COOLING BRAKE RIMS
Filed Aug. 11, 1930  3 Sheets-Sheet 3
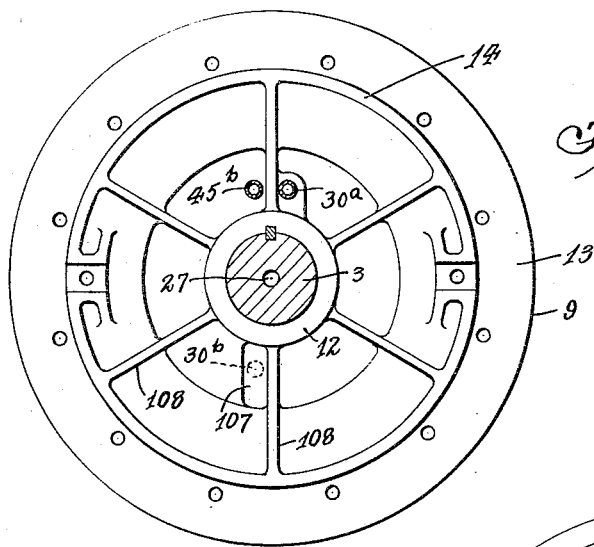
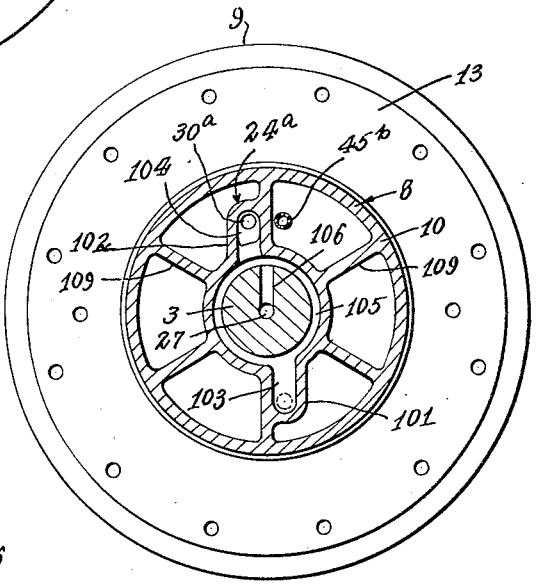
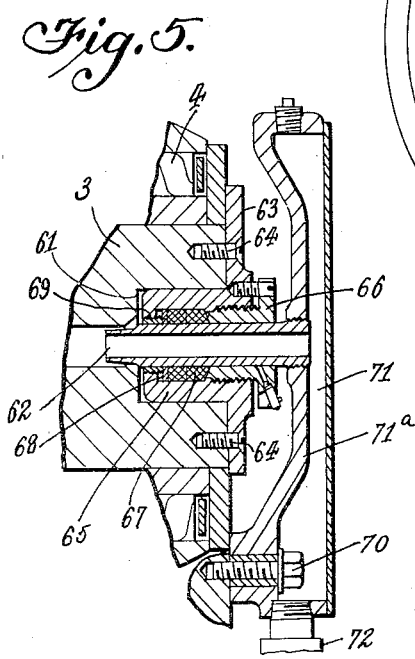
Inventors
Allen Erwin Rice
Lewis Emanuel Zerbe
By Lyon & Lyon
Attorneys Patented Aug. 30, 1932

1,874,624

UNITED STATES PATENT OFFICE

ALLEN ERWIN RICE, OF HERMOSA BEACH, AND LEWIS EMANUEL ZERBE, OF MONETA, CALIFORNIA, ASSIGNORS TO THE NATIONAL SUPPLY COMPANY, OF TOLEDO, OHIO, A CORPORATION OF OHIO

DISTRIBUTION OF WATER FOR COOLING BRAKE RIMS REISSUED

Application filed August 11, 1930. Serial No. 474,548.

This invention relates to the distribution of water for cooling brake rims and is more particularly directed to the construction of a drum for use in hoisting apparatus, particularly a rotary drawworks wherein there is provided means for circulating water to the oppositely mounted brake rims so that the water will be circulated within the brake rims to carry heat from the brake rims.

This invention is addressed to an improvement over the invention disclosed in and by the co-pending application of David S. Faulkner and Lewis E. Zerbe for water distributing system for drawworks, filed August 11, 1930, Serial No. 474,549.

The principal object of this invention is to provide an improved form of means for distributing water in the spaced brake rims of a hoisting drum in which the water distribution manifolds are cast integral with the hoisting drum.

Another object of this invention is to provide an improved construction of drawworks drum which is formed of two half sections, each of which is formed with a water distribution manifold cast integral therewith.

Another object of this invention is to provide a drawworks drum with a water distribution means including spaced inlet and outlet manifolds mounted within the spooling portion of the drawworks drum and provided with means for conveying the water to the brake rim from the inlet manifold and for circulating the water around the brake rims for reconveying the said water to the outlet manifold and hence from the drawworks drum.

Other objects and advantages of this invention it is believed will be apparent from the following detailed description of a preferred embodiment thereof as illustrated in the accompanying drawings.

In the drawings:

Figure 2 is a fragmental sectional elevation of a drawworks illustrating the drum thereof in vertical midsection and illustrating the water distribution system embodying our invention.

Figure 5 is an enlarged fragmental sectional view of the liquid outlet means.

Figure 6 is an enlarged fragmental sectional view of the cooling liquid outlet means from the brake rim cooling chambers.

Figure 7 is an end elevation of one of the half sections of the drum.

Figure 8 is a similar sectional end elevation of one of the half drum sections taken substantially on the line 8—8 of Figure 2.

Figure 1:
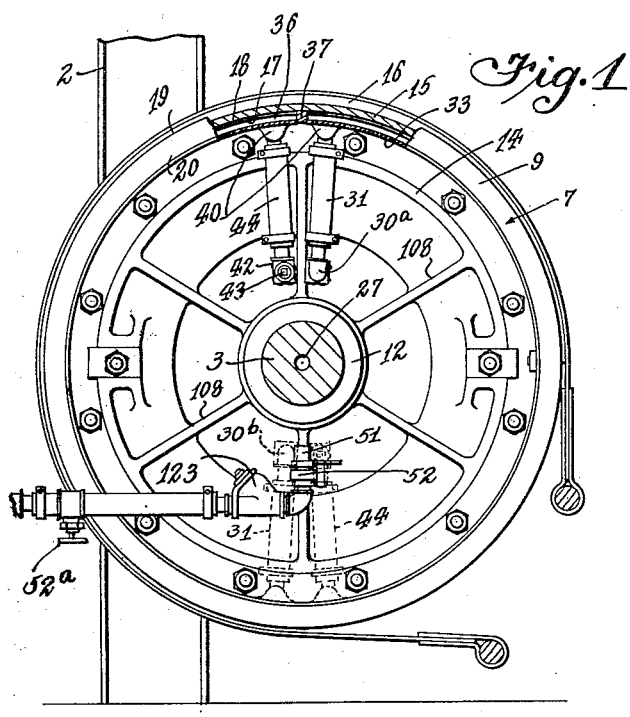
Figure 1 is an end elevation partly in section of a rotary drawworks drum illustrating our invention.
Figure 3:
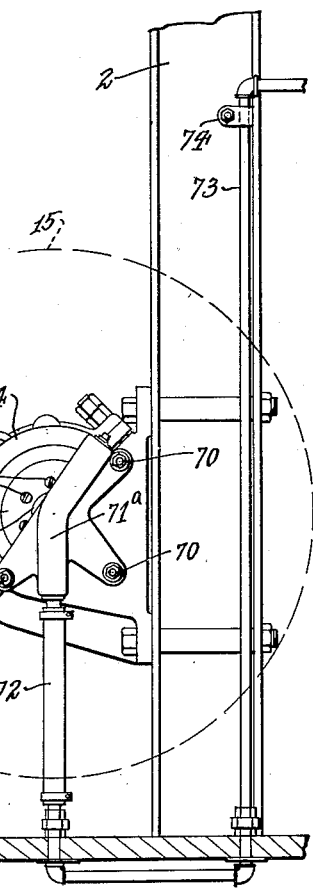
Figure 3 is a fragmental end elevation illustrating the manner of conveying the cooling fluid from the drawworks drum structure.
Figure 4:
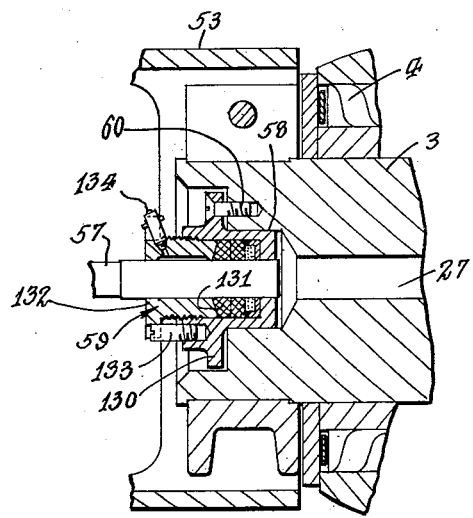
Figure 4 is an enlarged fragmental sectional view of the liquid inlet means.

In the preferred embodiment of our invention illustrated in the accompanying drawings, 1 and 2 illustrate the posts of a drawworks upon which the drawworks shaft 3 is rotatably supported in bearings 4. The drawworks shaft 3 is driven in any suitable or desirable manner such, for example, as through either of the sprockets 5 or 6 from another shaft supported by the posts 1 and 2. Mounted on the shaft 3 is the drawworks drum 7 which is preferably of the following construction:

The drawworks drum is herein illustrated as composed of two half sections 8 and 9 which are joined together at the center of the drum 7 after the half sections have been assembled on the drum shaft 3.

The half sections 8 and 9 of the drum 7 are of the same construction, each including a half spool section 10 formed integral with an inwardly extending flange 11 which terminates in a bearing hub 12 which extends longitudinally of the shaft 3. Each half section of the drum 7 likewise includes an upwardly extending annular flange 13 which is formed with an annular rib 14 upon which a brake rim 15 is fitted and secured in position by any suitable or desirable means.

The half sections 8 and 9 of the drum 7 are preferably formed as one piece castings and each of said castings includes a water distribution manifold 24a and 24b. The manifold 24a is carried by the half section 9 and forms the water inlet manifold, and the manifold 24b is carried by the half section 8 and provides the water outlet manifold. The manifolds 24a and 24b are cast integral with the half sections of the drum by casting the half sections with the inwardly extending flanges 11 thereof integral with diametrically opposed cored manifold distribution ears 101 and 102, the cores of the ears 101 and 102 extending through the bearing hub 12 to provide passages 103 and 104, and an annular distribution channel 105 extends around the shaft 3 in position to establish communication with transverse ports 106 extending through the shaft 103 from the inlet passage 27 and the outlet passage 50 formed axially of the shaft 3.

The flanges 11 are cast in offset position as indicated at 107 to provide one wall of the ears 101, and the flanges 11 are cast with ribs 108 which extend from the hub 12 to the spooling sections of the half drum sections.

Each of the half sections of the drum is therefore formed in the same manner and is formed with a spooling section, a hub connected with the spooling section by means of ribs reinforced by webs which do not extend to the hubs 12 but are cored outwardly to lighten the structure, and the flanges 11 formed of the ribs 108 and the connecting webs thereof are formed integral with manifold ears 101 and 102 which are cored to provide manifolds communicating with liquid passages extended through the supporting shaft 3.

The half sections 8 and 9 are formed at their inner adjacent edges with inwardly extending flanges 21 which, when the sections are assembled on the shaft 3, abut. Formed from the periphery of the half sections as assembled is a tapered chamber 22 in which the half sections of the drum are welded together and which, during the welding process, are filled with welding metal to form a straight, even spooling section of the drum. The flanges 21 are joined with the hubs 12 at points spaced around the inner periphery of the drum sections by bridge webs 109 which are cast integral during the casting of the half sections of the drum.

Brake bands 16 which may be of any suitable or desirable construction are mounted upon the brake rims 15 by any suitable or desirable form of brake actuating means.

The brake rims 15 are provided on their inner periphery with alternately spaced annular ribs 17 and annular grooves 18 providing an increased surface on the inner periphery of the brake rims so as to increase the heat transfer area from the brake rims 15 to the cooling liquid circulated within the brake rims 15. The brake rims 15 are provided at their outer periphery with upwardly extending retaining flanges 19, and on their inner periphery with a downwardly extending flange 20.

Extending from diametrically opposite points of the inlet manifold 24a are inlet conduits 30a and 30b. The inlet conduit 30a is a short conduit and extends to the adjacent brake rim 15 while the inlet conduit 30b is a longer conduit and extends to the brake rim at the opposite end of the drum structure. The conduits 30a and 30b are coupled through flexible hose couplings 31 with the inlets 32 formed in the retaining fluid rings 33 secured in position spaced from the brake rims 15. The retaining fluid rings 33 are secured in position on shoulders 35 formed on the inner periphery of the rims 15 and on the edge of the inwardly extending flanges 20 by any suitable or desirable means such, for example, as welding the said retaining fluid rings in position.

The retaining fluid rings 33 are of such diameter as to provide between their outer periphery and the inner periphery of the brake rim 15 a cooling liquid chamber 36 in which the cooling liquid supplied from the inlet manifold 24a is circulated. A dam 37 is provided adjacent the inlet 32 across the chamber 36 for each brake rim 15 so that the cooling liquid is caused to travel completely around the brake rim before it passes out through the outlet 38 formed adjacent but on the opposite side of the dam 37 from the inlet 32.

Header boxes 40 are secured to the fluid retaining rings 33 and are provided with the inlets 32 and outlets 38. Within the header box 40 the fluid retaining rings are perforated as indicated at 41. The flexible conduits 31 extending from the inlet conduits 30a and 30b are connected directly with the header boxes 40 so that the cooling liquid is passed into the cooling chamber 36 through the header boxes 40.

The cooling liquid outlet manifold 24b is of the same construction as the cooling liquid inlet manifold 24a and is provided with long and short outlet conduits 45a and 45b which are likewise connected by means of flexible conduits 44 with the header boxes 40 providing the outlets 38. In case of the outlets, the flexible conduits 44 are connected with flow restriction plugs 43 which are screw-threaded in position in T's 42 secured to the conduits 45a and 45b.

Each brake rim 15 is cooled in the same manner and is provided with the same form of inlet and outlet means which are fed from the inlet manifold 24a and from which the cooling liquid is delivered to the outlet manifold 24b.

The cooling liquid is delivered to the inlet port or passage 27 formed axially of the shaft 3 from a supply conduit 51 which is connected with any suitable supply of water under pressure. In order to regulate the flow of water to the brake rims, a valve 52a is interposed in the conduit 51.

In order to secure the inlet pipe in position, a supporting member 53 is secured to the post 1 and the inlet pipe 51 is passed therethrough as indicated at 54 and 55. A T 56 is mounted in the inlet pipe 51 and a branch pipe 57 is secured to the T and extends in a direction axially of the shaft 3. An enlarged chamber 58 is formed in the end of the shaft 3 and the branch pipe 57 extends into this chamber and is packed in position by a packing gland 59 which is secured as indicated at 60 to the shaft 3 so that it may rotate therewith and around the branch pipe 57. The packing gland 59 includes a gland housing member 130 within which packing 131 is positioned, the packing 131 being compressed within the housing 130 by means of a packing gland follower 132 which is threaded into the housing member 130 and is locked in position by means of a lock screw 133. Means as indicated at 134 is provided for lubricating the packing gland 59.

The inlet conduit 51 is loosely fitted through the ports 54 and 55 formed in the supporting bracket 53, and is yieldably held in position so as to maintain the branch 57 thereof in alignment with the shaft 3 by means of a collar 52 which is secured in position on the conduit 51 by means of a set screw 120.

Interposed between the collar 52 and the bracket 53 is a spring 121. The spring 121 acting against the bracket 53 and the collar 52 holds the pipe 57 yieldably in alignment with the shaft 3. Mounted in the conduit 51 is a relief valve 122 which may be of any suitable or desirable construction and is provided for the purpose of relieving excess pressure which might develop within the closed circulation system provided in accordance with this invention should the brake rims 15 develop excessive heat and the flow of cooling liquid become stopped.

In order to avoid the stoppage of the circulation system and to keep foreign matter from the system, we prefer to mount a screen device illustrated at 123 in the conduit 51.

The liquid passing from the outlet manifold 24b passes through the outlet 50 formed longitudinally of the shaft 3 into an enlarged chamber 61 formed in the opposite end of the shaft 3 and into which chamber 61 the outlet pipe nipple 62 extends.

A plate 63 is secured in position over the end of the shaft 3 by means of bolts 64 spaced around the end of the shaft 3. The plate 63 is formed integral with a sleeve 65 which extends into the enlarged chamber 61.

A follower 66 engages the packing 67 at its inner end, which packing 67 engages a ring 68 on its opposite face. The ring 68 is supported in position by a plug 69 threaded into the sleeve 65 within the chamber 61 so that the packing 67 is compressed against the outlet nipple 62 to form a fluid tight joint permitting the shaft 3 to rotate around the nipple 62.

Secured to the post 2 is an outlet passage member 71a which is secured to the post 2 by means of bolts 70 at its lower end and extends vertically upward therefrom. The outlet passage member 69 is provided with an outlet passage 71 into which the nipple 62 is screw-threaded. The outlet passage 71 is in communication with an outlet conduit 72 which is secured at the lower end of the passage 71 and extends downwardly and is secured at its lower end to a pipe 73 which is passed through a clip 74 secured to the post 2. The pipe 73 extends upwardly to a point above the highest point of the cooling liquid chamber 36.

The hose 73 is extended over the clip 74 at a point elevated from the axis of the shaft 3 and preferably to a point near the level of the highest point of the chamber 36 formed around the brake rims 15 so as to maintain a head or back pressure on the liquid used to cool the brake rims to insure that the chamber 36 will at all times remain filled with the cooling liquid or water.

Having fully described our invention, it is to be understood that we do not wish to be limited to the details herein set forth, but our invention is of the full scope of the appended claims.

We claim:

1. In a rotary drawworks, the combination of a drum shaft, a drum supported on the drum shaft, a pair of spaced manifolds mounted within the drum, brake rims at the opposed ends of the drum, means for passing a cooling liquid to one of said manifolds, means for delivering the cooling liquid from the latter said manifold to the brake rims, means for returning the cooling liquid to the other manifold, and means for conducting the cooling liquid from the manifold.

2. In a rotary drawworks, the combination of a drum, a shaft supporting the drum, brake rims at the opposite ends of said drum, the drum being formed of two half sections, each including a half of the spooling portion of the drum, an end flange, a brake rim secured thereto, a cooling liquid distribution manifold, means for securing the half drum sections together, means for conveying the cooling liquid from one of said manifolds to the oppositely mounted brake rims, means for circulating the cooling liquid around the brake rims, and means for conducting the cooling liquid from the brake rims back to the other said manifold.

3. In a rotary drawworks, the combination of a drum, a shaft supporting the drum, the drum being formed of half sections, each of which includes a portion of the spooling area of the drum, and a cooling liquid distribution manifold, means for securing the said half sections together, brake rims mounted at the opposed ends of said drum, means for conveying a cooling liquid from one of said manifolds to the brake rims mounted at the opposed ends of the drum section, means for circulating the cooling liquid around the brake rims, means for conveying a cooling liquid from the brake rims back to the other said manifold, and means for conveying the cooling liquid from the manifold.

4. In a rotary drawworks, the combination of a drum shaft, a drum secured to the shaft, brake rims at the opposite ends of the drum, spaced cooling liquid inlet and outlet manifolds mounted within the drum, means for passing a cooling liquid to the inlet manifold, means for conducting the cooling liquid from the inlet manifold to the opposed brake rims, means for retaining the cooling liquid within the brake rims, and means for conducting the cooling liquid from the brake rims back to the outlet manifold.

5. In a rotary drawworks, the combination of a drum, a drum shaft supporting the drum, brake rims at the opposite ends of said shaft, cooling liquid retaining rings positioned within the brake rims and spaced therefrom to provide a cooling chamber within a periphery of the brake rims, the drum being formed of half sections each of which section includes a portion of the spooling area of the drum, bearing hubs, means supporting the bearing hubs from the spooling portion, and cooling liquid manifolds cast integrally therewith, means for securing the half sections of the drum together, means for conducting a cooling liquid to one of said manifolds, conduits extending from the latter said manifold to the cooling liquid chambers within the periphery of the brake rims, means for conducting the cooling liquid from said chambers to the other said cooling liquid manifold, and means for conveying the cooling liquid from the latter said manifold.

6. In a rotary drawworks, the combination of a drum, a shaft supporting the drum, brake rims at the opposed ends of said drum, the drum being formed of two half sections, each of which carries a cooling liquid distribution manifold, means for securing the half drum sections together, means for conveying cooling liquid from and delivering it to the said cooling liquid distribution manifolds, and means for circulating cooling liquid around the brake rims.

7. In a rotary drawworks, the combination of a drum formed of two portions, each of which includes a cooling liquid distribution manifold and a brake rim, means for securing the two portions of the drum together, means for conveying cooling liquid to one of said manifolds and from said manifold to the brake rims of the portions of the drum, means for circulating the cooling liquid around the brake rims, means for conducting the cooling liquid from the brake rims back to the other said manifold, and means for conveying the cooling liquid from the latter said manifold.

Signed at Torrance, Calif. this 30th day of July, 1930.

ALLEN ERWIN RICE.
LEWIS EMANUEL ZERBE.